United States Patent
Waschulzik et al.

(10) Patent No.: US 12,411,824 B2
(45) Date of Patent: Sep. 9, 2025

(54) METHOD OF ASSESSING INPUT-OUTPUT DATASETS USING LOCAL COMPLEXITY VALUES AND ASSOCIATED DATA STRUCTURE

(71) Applicant: Siemens Mobility GmbH, Munich (DE)

(72) Inventors: Thomas Waschulzik, Freising (DE); Simon Geerkens, Düsseldorf (DE); Christian Sieberichs, Düsseldorf (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/526,182

(22) Filed: Dec. 1, 2023

(65) Prior Publication Data
US 2024/0184758 A1    Jun. 6, 2024

(30) Foreign Application Priority Data
Dec. 1, 2022    (EP) .................................... 22210917

(51) Int. Cl.
*G06F 16/215*    (2019.01)
*G06F 16/23*    (2019.01)
*G06F 16/28*    (2019.01)

(52) U.S. Cl.
CPC ........ *G06F 16/215* (2019.01); *G06F 16/2365* (2019.01); *G06F 16/285* (2019.01)

(58) Field of Classification Search
CPC ... G06F 16/215; G06F 16/285; G06F 16/2365
See application file for complete search history.

(56) References Cited

U.S. PATENT DOCUMENTS

| | | | |
|---|---|---|---|
| 11,824,741 B1* | 11/2023 | Engi | ...................... H04L 43/06 |
| 2022/0374648 A1* | 11/2022 | Mizobuchi | .............. G06F 18/22 |
| 2023/0121276 A1 | 4/2023 | Waschulzik | |
| 2024/0095308 A1* | 3/2024 | Thomas | .............. G06F 18/2415 |

FOREIGN PATENT DOCUMENTS

DE    102020203135 A1    9/2021

OTHER PUBLICATIONS

XP002809307,Jun. 17, 2015 (Jun. 17, 2015), Retrieved from the Internet: URL:https://www.google.com/maps/d/viewer?mid=1Np8r2Ub2RUg8mPllby3aGuNqtSg&vpsrc=6&ctz=360&ie=UTF8&t=m&oe=UTF8&msa=0&ll=42.04604985417672%2C-87.68795804100039&z= 17.

Halliger, Digital Engineering Measurement Framework Addendum, version 0.51, publ. May 13, 2022.

(Continued)

*Primary Examiner* — William P Bartlett
(74) *Attorney, Agent, or Firm* — Laurence A. Greenberg; Werner H. Stemer; Ralph E. Locher

(57) ABSTRACT

In a computer-implemented method of enabling an assessment of a plurality of datasets, the datasets each includes an input datapoint and an associated output datapoint. The plurality of datasets can be part of training data or validation data of a machine-learning algorithm such as a neural network. For each dataset multiple local complexity indicators are determined for multiple neighborhoods in the input space. A data structure is constructed that keeps track of the local complexity indicators.

13 Claims, 6 Drawing Sheets

(56) References Cited

OTHER PUBLICATIONS

Halliger, Practical Software and Systems Measurement (PSM) Digital Engineering Measurement Framework, p. 1-82, Jun. 2022, version 1.1c.
Halliger, Runtime, Aug. 26, 2021, p. 1-14, version: v009.
Galvao et al., A method for calibration and validation subset partitioning, Talanta, 2005, pp. 736-740, vol. 67, Issue 4, Elsevier, Amsterdam, NL.
Sun et al., A sample selection method specific to unknown test samples for calibration and validation sets based on spectra similarity, Spectrochimica Acta Part A: Molecular and Biomolecular Spectroscopy 258, 2021, pp. 1-8 Elsevier, Amsterdam, NL.

\* cited by examiner

METHOD OF ASSESSING INPUT-OUTPUT DATASETS USING LOCAL COMPLEXITY VALUES AND ASSOCIATED DATA STRUCTURE

CROSS-REFERENCE TO RELATED APPLICATION

This application claims the priority, under 35 U.S.C. § 119, of European Patent Application EP22210917.5, filed Dec. 1, 2022; the prior application is herewith incorporated by reference in its entirety.

FIELD AND BACKGROUND OF THE INVENTION

Various examples of the disclosure pertain to enabling and implementing assessment of a plurality of datasets, each dataset including a respective input datapoint and an associated output datapoint. A quality assessment of the plurality of datasets is enabled.

The number of application fields and use cases which employ machine-learning algorithms—e.g., deep neural networks, classification algorithms, regression algorithms, support vector machines, to mention just a few examples—has widely increased over the past few years.

Machine-learning algorithms are trained using training data. Training data typically includes a plurality of datasets, each dataset including a respective input datapoint in an input space and an associated output datapoint in an output space. The output datapoint can act as ground truth during the training. For instance, the output datapoint could indicate a classification label (for a classification task) associated with the input datapoint. By way of example, the input datapoint could be sensor data of a turbine (e.g., vibration strength, stress, pressure) and the output datapoint could indicate: "operational" or "faulty." This is, of course, only one example of a wide spectrum of possible inference tasks.

The accuracy of the inference tasks achievable by the machine-learning algorithm depends on the training data. For instance, it is conceivable that certain areas of the input space are not sampled by the training data so that inference tasks in such regions would rely on extrapolation of knowledge obtained for other areas of the input space. This can increase the uncertainty in the inference task and, typically, also the inaccuracy. Furthermore, it is conceivable that certain datasets are faulty, e.g., because the output datapoint is corrupted, e.g., indicates a wrong class for a classification task.

Typically, the sheer size of training data—e.g., counts of plurality of datasets used as training data can be greater than 10,000 or 100,000 or even 1,000,000—makes it difficult to assess the respective datasets by manual inspection. It is difficult to check whether the input space is evenly sampled. It is difficult to check whether certain datasets are faulty.

This is problematic, because certain inference tasks can be relevant for safety. Examples would include control of autonomous vehicles. Here, to ensure a compliance with safety regulations, certain key properties of training data may have to be ensured prior to executing the inference task.

SUMMARY OF THE INVENTION

Accordingly, there is a need for assessing plurality of datasets. For example, there exists a need for the assessment of training data or validation data or test data or inference data obtained from a machine-learning algorithm during inference. In particular, there exists a need for techniques that enable the assessment of data that includes the plurality of datasets in view of quality figures such as density of sampling of the input space, abnormalities/outliers, etc.

With the above and other objects in view there is provided, in accordance with the invention, a computer-implemented method of enabling the assessment of a plurality of datasets. Each dataset of the plurality of datasets includes a respective input datapoint in an input space and an associated output datapoint in an output space. The method includes for each dataset of the plurality of datasets: determining multiple local complexity indicators for multiple neighborhoods of the input datapoint of the respective dataset in the input space, the multiple neighborhoods having different sizes. Any given local complexity indicator is based on differences between input distances and output distances. The input distances are in the input space between the input datapoint of the respective dataset and the input datapoints of each of multiple further datasets in the respective neighborhood. The output distances are in the output space between the output datapoint of the respective dataset and the output datapoints of each of the multiple further datasets in the respective neighborhood. The method also includes determining an array data structure comprising at least an array dimension ("first array dimension") and a further array dimension ("second array dimension"). The array dimension resolves the multiple neighborhoods based on their sizes. The further array dimension resolves the local complexity values. Entries of the array data structure are indicative of a frequency of the occurrence of the respective local complexity values at the respective size of the neighborhoods across all datasets of the plurality of datasets.

As noted above in the parentheticals, the array dimension may also be labelled "first array dimension" and the further array dimension may also be labeled "second array dimension."

Each entry of the array data structure may further include an identification of the datasets that are associated with the respective frequency of the occurrence of the local complexity values.

The method may further include controlling a user interface to provide access to the array data structure, and controlling the user interface to receive a user selection of a subsection of the array data structure. The method may further include selecting a subset of the plurality of datasets associated with the subsection and controlling the user interface to output information associated with the subset of the plurality of datasets.

A computer program or a computer-program product or a computer-readable storage medium includes program code. The program code can be loaded and executed by at least one processor. The at least one processor, upon executing the program code, performs the above-identified method.

A processing device includes at least one processor and a memory. The at least one processor can load program code from the memory and execute the program code. The at least one processor, upon executing the program code, is configured to perform the above-identified method.

It is to be understood that the features mentioned above and those yet to be explained below may be used not only in the respective combinations indicated, but also in other combinations or in isolation without departing from the scope of the invention.

DETAILED DESCRIPTION OF THE INVENTION

Figure 1A:
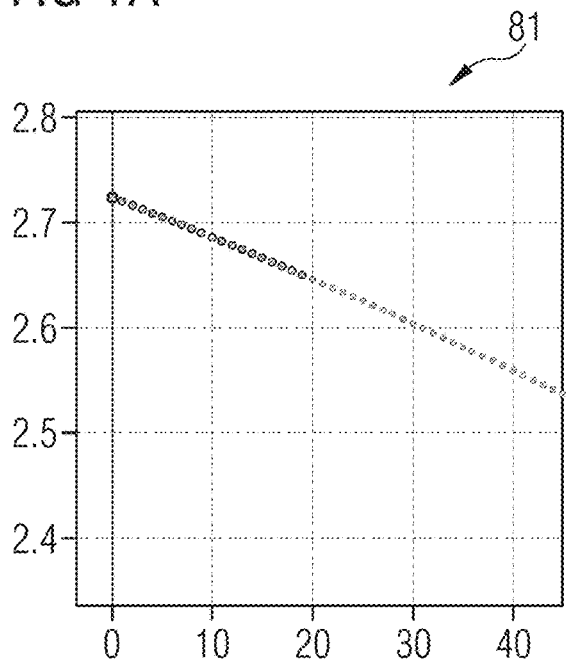
FIG. 1A schematically illustrates multiple datasets and a neighborhood of a given dataset of the multiple datasets.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques that facilitate assessment of multiple datasets will be disclosed. The datasets are input-output datasets, i.e., each dataset includes a pair of an input datapoint and an output datapoint.

To give an example, input datapoints could be N-dimensional vectors of sensor readings. For instance, typical dimensionality of such input datapoints can be in the range of 3 to 20, or more (e.g., up to 10.000). This defines the dimensionality of the input space in which the input datapoints are arranged.

The dimensionality of the input datapoints/the input space depends on the particular use case. For instance, it would be possible to consider input datapoints that describe the operation of a machine or apparatus based on sensor readings of sensors attached to the apparatus and/or state reports provided by a control unit of the apparatus. For example, it would be possible that the apparatus is a turbine, e.g., a gas turbine or an airplane engine. It would be possible that sensors are attached to such turbine that measure vibrations and temperature, e.g., at multiple positions. Stress or strain of certain parts of the turbine could be monitored using respective sensors. For example, a predictive-maintenance use case may benefit from such input data. For instance, an inference task may predict whether maintenance is required or not. It would also be possible to implement a regression task (instead of a classification task) to predict a likelihood of a false state within a certain predetermined time duration or the expected remaining failure free operation time.

In another example, the functioning of an autonomous vehicle, e.g., a train, could be monitored. For instance, vibrations, temperature, and velocity of certain parts of the engine of the train may be monitored. This may be used to detect root error causes for fault states of the train engine.

In yet another example, operation of a railroad switch may be monitored. For instance, while switching between different positions of the railroad switch, vibrations in an actuator and/or at joints of the railroad switch can be monitored and respective measurement data can be provided as measurement vectors defining the input datapoints.

In a further example, railroad tracks or a drivable area can be detected, e.g., in 2-D image data acquired using a camera. Objects situated on the railroad tracks or on the drivable area can then subsequently be detected. If objects situated on the railroad tracks or on the drivable area are detected, the objects can be classified. For example, a binary classification whether an object is a person or not can be executed.

In yet a further example, landmarks arranged in a surrounding can be detected, e.g., in 2-D image data acquired using a camera. For instance, a traffic light could be detected. Positioning signs could be detected.

Further, anomalies in a behavior of a technical system can be detected. For example, it could be detected whether cargo in a container has moved.

The examples provided above are only some examples and multiple other examples are conceivable. Specifically, similar to such variation of the dimensionality and/or type of the input datapoints and the input space, variations are possible for type and dimensionality of the output datapoints and output space.

The dimensionality of the input space, the dimensionality of the output space and the particular use case is not germane for the techniques disclosed herein. The described techniques facilitate use-case agnostic assessment of datasets. The techniques can handle various dimensionalities of input space and output space and various contents of the datapoint.

Various techniques enable the assessment of datasets. Specifically, relationships between datapoints of the datasets with respect to each other can be investigated.

As a general rule, the plurality of datasets could define training data or validation data or test data. Training data can be used for training a machine-learning algorithm. Validation data and test data can be used for validating whether a pre-trained machine-learning algorithm correctly operates. In further detail, a model underlying the machine-learning algorithm is initially for to training data, e.g., using training employing gradient descent or variations for backpropagation. Successively, once the model of the machine-learning algorithm has been fit to the training data, the validation data can be used to provide an unbiased evaluation of the model fit; at this stage, hyperparameters may be tuned. The test data can then be used to provide a final, unbiased evaluation.

The plurality of datasets could also define inference data. Here, the input datapoints can be obtained from sensor data. Ground truth may not be available. However, a prediction of a machine-learning algorithm can be provided as part of an associated inference task, forming the output datapoints.

Example machine-learning algorithms that can be trained and/or validated and/or supervised based on such data include, but are not limited to: neural networks; deep neural networks; convolutional neural networks; support vector machines; classification machine-learning algorithms; regression machine-learning algorithms; recurrent neural networks; etc.

While various examples will be discussed hereinafter in the context of assessing training data, similarly the techniques may be readily applied to assess validation data or test data.

Datasets that are used as training data for training a machine-learning algorithm include output datapoints that are used as ground truth for the training, to calculate a loss value based on the output of the machine-learning algorithm in its current training state and the output datapoint. Conventional techniques for training machine-learning algorithms, e.g., back propagation for neural network algorithms, can be employed to adjust the weights of the machine-learning algorithms. The particular implementation of the training is out the scope and the techniques disclosed herein can collaborate with various training techniques, e.g., initial training, continuous training, federated learning, etc. The techniques disclosed herein rather primarily relate to the upstream assessment of the training data, e.g., whether or not the training data is suitable for the training.

Such application of assessment of training data helps to assess an accuracy of the associated machine-learning algorithm at inference. In detail, once the machine-learning algorithm has been trained, the machine-learning algorithm can be used to solve inference tasks, e.g., classification tests or regression tasks. Thus, the machine-learning algorithm can make a prediction of an output datapoint based on a corresponding input datapoint, when no ground truth is available. Again, the type of inference task is not germane for the techniques disclosed herein. The techniques can flexibly enable assessment of training data for various types of inference tasks.

Next, aspects are described that enable determining a data structure that practically enables the assessment of test data, validation data, or training data (or more generally of any example data). The data structure structures the relationships between the input datapoints and output datapoints of the plurality of datasets, so that even for extremely large counts of datasets efficient and meaningful assessment is possible.

The data structure tracks multiple local complexity indicators that are determined for each dataset of a plurality of datasets. For a given dataset, the multiple local complexity indicators are determined for multiple neighborhoods of that given dataset.

As a general rule, various kinds and types of local complexity indicators can be used. In some examples, local complexity indicators are based on differences between input and output distances between input/output datapoints of datasets in a certain neighborhood.

The neighborhood can be defined with respect to the input datapoint of a given dataset in the input space. Different criteria can be used to construct neighborhoods, e.g., k-nearest neighbors or distance in input space.

It is then possible to determine the data structure that stores the local complexity indicators.

The data structure can store the local complexity indicators in an aggregated manner. A histogram approach can be used where the frequency of occurrence of certain complexity values (lying within a certain bin) for a given neighborhood size is considered.

Use of such data structure has the advantage that it can be quickly assessed how the various datapoints are arranged with respect to each other in input space and output space. Datasets that have comparable arrangements of the input and output datapoints in the input space and in the output space can be identified, because they are in the same bin. Thus, the data structure enables efficient assessment of the plurality of datasets.

Next, details with respect to an example implementation of the local complexity indicators will be described. One type of local complexity indicator can be calculated according to:

$$QI^2R(P) = \frac{1}{|P^2|} \cdot \sum_{x \in P^2} (d_{NRE}(x) - d_{NRA}(x))^2 \quad (1)$$

Here, P are all datasets in the respective neighborhood of the given dataset. $d_{NRE}$ is the distance between the input datapoint of the given dataset and the input datapoint of a respective dataset (x) in the neighborhood; $d_{NRA}$ is the distance between the output datapoint of the given dataset and the output datapoint of the respective dataset. The Euclidian distance or another distance metric may be considered. A difference of these distances is considered in Equation (1).

As a general rule, various options exist for determining the neighborhood (and with it P). For instance, k-nearest neighbors (KNN) may be considered which provides the so-called MLQI² matrix:

$$mlqi^2[i,k](P) = QI^2(KNN_{re}(P,p_i,k)) \quad (2)$$

The MLQI² matrix describes the complexity of every dataset having index i for all neighborhoods k. Using neighborhoods defines based on the nearest neighbors is only one example. In another example, neighborhoods could be determined based on n-dimensional spheres (for an n-dimensional input space), wherein the spheres are progressively larger.

FIG. 1A is a plot 81 of multiple datasets (circles). The plot 81 provides the position of the input datapoints along the X-axis and the position of the output datapoints along the Y-axis.

Also illustrated is the KNN for a certain dataset (large dark circle) with k=19. The datasets part of this neighborhood are emphasized in the plot.

To construct a data structure it is necessary to compare the local complexity values for different datasets and neighborhoods. This is achieved using binning.

Here, each value of $MLQI^2$ is associated with a respective bin $$v = 0, 1, 2, \ldots, \left[\frac{\max_{hi} - \min_{hi}}{binsize_{hi}}\right].$$

This yields the so-called $HLQI^2$ ("H" for histogram):

$$hlqi_2[v, k](P) = \sum_{i=1}^{|P|} I^3(mlqi^2[i, k](P), v) \cdot blqi^2[i, k](P) \quad (3)$$

Here, the function $I^3(h,v)$ returns "1" if $$v \leq \frac{h - \min_{hi}}{binsize_{hi}} < v+1$$

holds true; or else returns "0". Thus, by means of the function we check whether the complexity of a given dataset $p_i$ is within a certain bin $v$.

Finally, summing is executed across all datasets $p_i$. This process is repeated for each bin $v$. Thus, the distribution of the frequency of occurrence of all datasets $p_i$ v k.

Figure 1B:
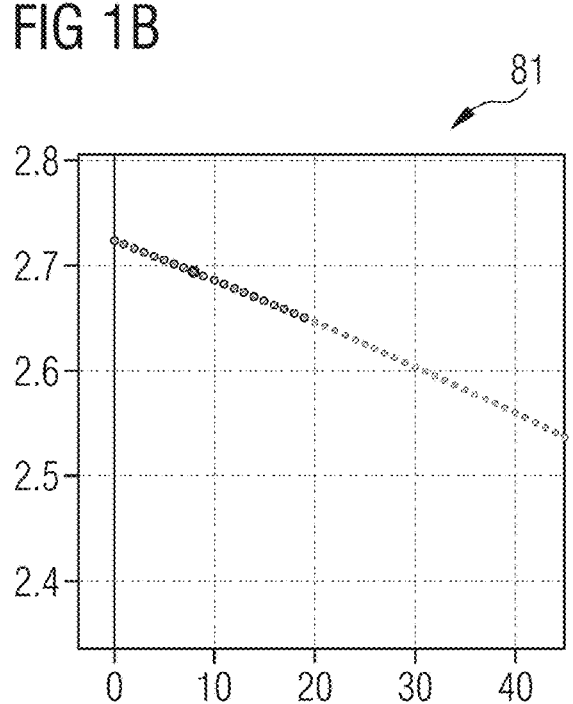
FIG. 1B schematically illustrates multiple datasets and a neighborhood of a given dataset of the multiple datasets.
Figure 2:
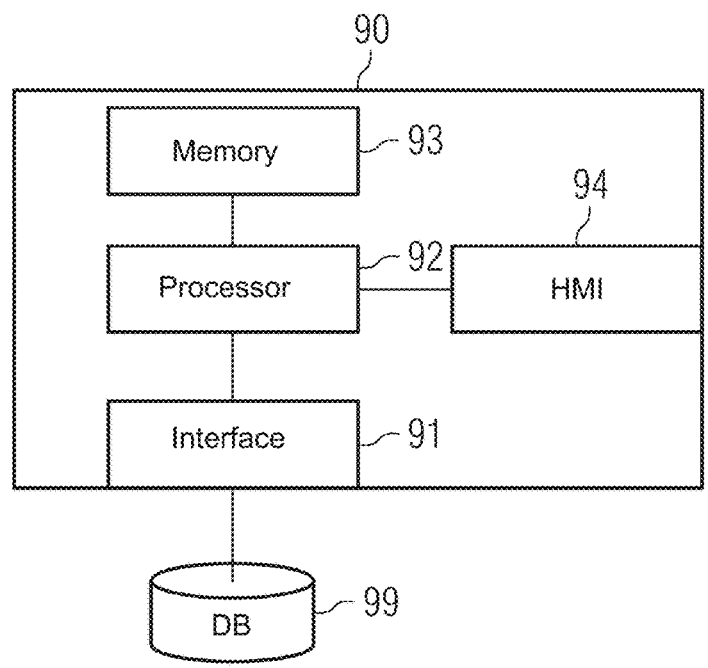
FIG. 2 schematically illustrates a processing device according to various examples.

The term $blqi^2$ helps to avoid boundary effects. $blqi^2$ is generally optional. Here, each neighborhood is only considered once. This is relevant for neighborhoods of datasets having input datapoints at an edge of the input space. This is illustrated in FIG. 1B. FIG. 1B shows the plot 81 of the same datasets as FIG. 1A. However, the KNN neighborhood with k=19 is highlighted for another dataset (large dark circle). The neighborhoods in FIG. 1 and FIG. 2 are the same. Thus, they would yield the same value for $MLQI^2$. By using $BLQI^2$ the $MLQI^2$ is only determined once for all identical neighborhoods and only used once in subsequent calculations, by the appropriate bookkeeping.

The $BLQI^2$ is determined as follows:

$$blqi^2[i, k](P) = \begin{cases} 1, & \forall j < i \mid KNN_{re}(P, p_j, k) \neq KKN_{re}(P, p_i, k) \\ 0, & else \end{cases} \quad (4)$$

$SHLQI^2$ is a normalized version of $HLQI^2$ (normalized to [0|1]):

$$shlqi^2[v, k](P) = \left(\frac{hlqi^2[v, k](P)}{\sum_{s=1}^{|P|} hlqi^2[s, k](P)}\right)^{gamma_{hi}} \quad (5)$$

Here $gamma_{hi}$ denotes a gamma calibration of the histogram to clearly show every indicator, even if there is a huge difference in the number of datasets stored in different bins. It only serves for a better visualization.

As will be appreciated, both $HLQI^2$ as well as $SHLQI^2$ describe the frequency of occurrence of certain local complexity values across all datasets. They are array data structures. A first array dimension resolves the multiple neighborhood based on their sizes (e.g., increasing values for k-nearest neighbors, KNN); and a second array dimension resolves respective local complexity values (e.g., in discrete bins). Entries of the array data structure are indicative of the frequency of occurrence of the local complexity values across all datasets.

These data structures help to quickly and comprehensively assess multiple datasets, even where the count of the datasets is large, e.g., larger than 100 or larger than 10,000 or even larger than 1,000,000.

The binning/histogram approach reduces complexity and makes information of different data structures comparable.

Such an approach is further based on the finding that in particular for high-dimensional datapoints—as are typically encountered for input space and output spaces in practical use cases—human perception can be inherently limited. For instance, there are techniques known to map high-dimensional datapoints to lower dimensions, e.g., the Uniform Manifold Approximation and Projection (UMAP). Another example is t-SNE. However, these techniques are based on the finding that such conventional projections can sometimes lead to inaccuracy or distortions of, e.g., distances between datapoints, so that an assessment based on such pre-existing solutions can lead to errors. By considering formalism disclosed herein, a low-dimensional representation of distances can be achieved; without distortions or falsifications introduced by conventional techniques such as UMAP.

FIG. 2 schematically illustrates a computing device 90 according to various examples. The computing device 90 could be a personal computer or a server. The computing device 90 includes a processor 92 and a memory 93. The computing device 90 also includes a communication interface 91. The processor 92 may be a graphics processing unit (GPU) comprising multiple compute units operating in parallel. It would be possible that the computing device 90 includes multiple GPUs in parallel for distributed processing.

The processor 92 can load, via the communication interface 91, a plurality of datasets from the database 99. The plurality of datasets could also be retained in a local memory 93.

The processor 92 can load program code from the memory 93 and execute the program code. The processor, upon loading and executing the program code can perform techniques as disclosed herein, e.g.: enabling assessment of a plurality of datasets; determining a data structure based on frequencies of occurrences of local complexity values; controlling a human machine interface (HMI) 94 to provide a graphical user interface (GUI) to output a plot based on the data structure; access the data structure to assess the quality and/or complexity of the plurality of datasets; use the plurality of datasets as training data for training a machine-learning algorithm such as a deep neural network, support vector machine, etc.; using the machine-learning algorithm for inference; use the plurality of datasets as validation data or test data; etc.

Figure 3:
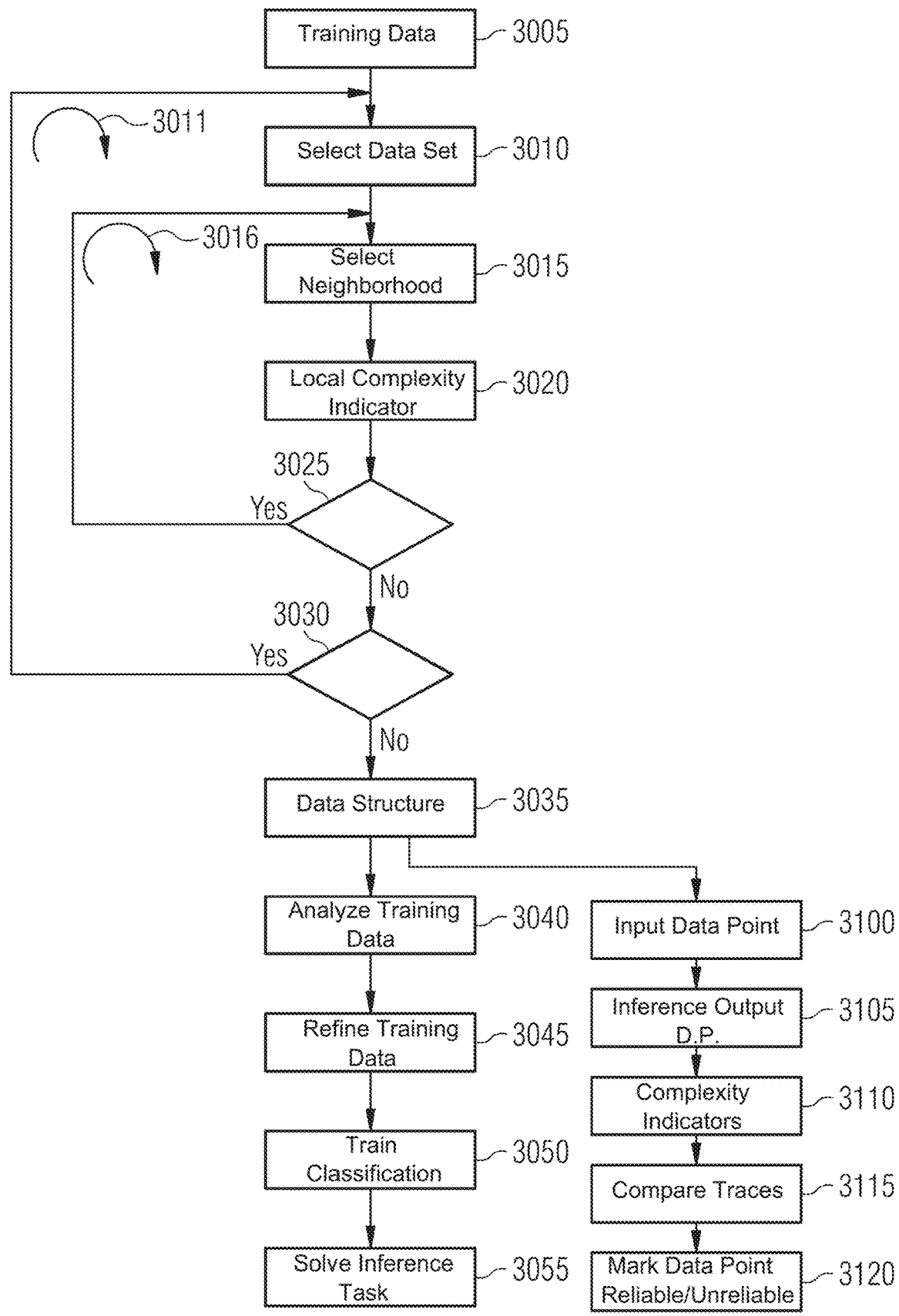
FIG. 3 is a flowchart of a method according to various examples.

FIG. 3 is a flowchart of a method according to various exemplary implementations of the invention. The method of FIG. 3 is associated with assessing the quality or complexity of a plurality of datasets. In particular, the plurality of datasets, in the example of FIG. 3, form training data for training a classification algorithm. As a general rule, other input-output datasets—i.e., other than training data—may also be subject to the method as illustrated in FIG. 3, but for illustrative purposes such example of training data is used for explanation below. Similar techniques may be readily applied where the plurality of datasets form validation data or test data.

The method of FIG. 3 can at least partly be executed by a processor based on program code that is loaded from a memory and executed. For instance, at least some of the boxes of FIG. 3 may be executed by the processor 92 of the computing device 90 upon loading and executing program code from the memory 93 (cf. FIG. 2).

Training data is obtained at box 3005. For instance, the training data may be loaded from a database via respective communication interface (see FIG. 2: database 99 and communication interface 91). For instance, the training data may be loaded from a local memory.

In some examples, box 3005 can also include acquisition of training data. For example, input datapoints and/or output datapoints can be acquired using suitable sensors and/or processing algorithms. The method can include controlling one or more sensors to acquire the plurality of datasets.

Acquisition of sensor data can be in accordance with an acquisition protocol. Box 3005 can include planning of the acquisition, i.e., determination of the acquisition protocol. This can help to ensure that the input space and/or the output space are appropriately sampled. This can help to ensure that typical sensors are used and would also be present in the field during inference tasks of the then trained machine-learning algorithm, e.g., exhibiting typical noise patterns or typical inaccuracies.

Obtaining the training data can also include partitioning datasets into training data and validation data and/or test data. I.e., a certain number of datasets can be available, e.g., from respective acquisition as explained above. Then these datasets can be subdivided, wherein a first set of datasets forms the training data and a second set of datasets then forms the validation data or test data.

Obtaining the training data can also include an annotation process. For instance, it would be possible that multiple input datapoints of corresponding datasets included in the training data are presented to a user, e.g., via an HMI such as the HMI 94, and the user manually assigns labels—thereby defining the output datapoints—to the input datapoints.

Beyond such supervised learning techniques also semi-supervised or unsupervised learning techniques would be possible where respective output datapoints are automatically generated (they may be pre-generated).

At box 3010, a current dataset of the plurality of datasets is selected. Iterations 3011 thus corresponds to cycling through all datasets obtained at box 3005. Parallel computing may be employed.

For instance, iterations 3011 may be distributed amongst multiple sub-threads associated with different processing units such as multiple GPUs and/or multiple compute units of a GPU (details will be explained later in connection with FIG. 7). Thereby, calculations for determining local complexity indicators are distributed across multiple processing devices such as compute units of a GPU.

At box 3015, a current neighborhood is selected for the current dataset. Accordingly, iterations 3016 correspond to cycling through all neighborhoods. For instance, progressively larger neighborhoods according to the KNN could be selected. k is then incremented from iteration to iteration 3016.

For instance, iterations 3016 may be distributed among multiple sub-threads associated with different compute units (details will be explained later in connection with FIG. 7). Thereby, calculations for determining local complexity indicators are distributed across multiple processing devices such as different GPUs and/or multiple compute units of a GPU.

Then, at box 3020 a local complexity indicator is determined for the current selected dataset and the current neighborhood. For example, see Eq. 2.

At box 3025, it can be checked whether a further iteration 3016 is required.

As a general rule, various options are available for implementing box 3025. Various decision criteria for determining whether a further iteration 3016 is required are conceivable.

For instance, it would be possible that a certain predetermined count of complexity indicators is determined for each dataset; in other words, a certain predetermined number of iterations 3016 could be executed for each dataset. This would mean that, e.g., for each dataset 200 or 500 neighborhoods are considered.

In a further scenario, it would be possible to consider whether to selectively abort at least a part of the calculations prior to reaching a predetermined number of considered neighborhoods. Such aborting can be based on probabilistic considerations. I.e., calculations for determining multiple local complexity indicators for a given dataset can be aborted with a certain probability, wherein the probability depends on the iteration 3016. For instance, it would be possible that such selective aborting is based on a probability that is progressively increased as the calculations progressively covered neighborhoods having larger sizes. In other words, it would be possible to reconsider for each iteration 3016 of box 3025 whether to proceed with a further iteration 3016 based on a probabilistic consideration. To give one concrete example, it would be possible to determine for each iteration 3016 of box 3025 a random number between 0 and 1. This random number between 0 and 1 can be compared against a threshold. The threshold can start at 1 for the first iteration, so that at least two iterations are always performed; from a certain iteration 3016 onward, the threshold can be progressively reduced from 1 towards 0. Thus, the probability to abort is progressively increased from iteration 3016 to iteration 3016 (beyond the certain iteration).

Since the decision to abort at a certain size of the neighborhood at 3025 is valid only for a single iteration 3011, a different number of neighborhoods will be generally considered for different datasets (box 3010), i.e., for different iterations 3011.

Such implementation using a probability-based truncation of further calculations for larger neighborhoods helps to reduce the computational burden imposed by determining the complexity indicators for all datasets. This is only one option and the other options for reducing the computational burden are available. For example, instead of aborting all subsequent iteration 3016, as explained above, it would be possible to skip certain iterations 3016 with a certain probability. Again, the probability can be progressively increased as the calculations progressively covered neighborhoods having larger sizes, i.e., the probability to skip a certain iteration 3016 can increase from iteration to iteration 3016.

If no further iteration 3016 is required for a given dataset, the method commences at box 3030 where we check whether a further dataset is to be processed. In the affirmative a further iteration 3011 is executed. Otherwise, the method commences at box 3035.

At box 3035, a data structure is determined/constructed. The data structure is in the form of an array, e.g., a 2-D array. This data structure keeps track of the frequency of occurrence of certain complexity values (box 3020) for certain neighborhood sizes (box 3015 and iterations 3016) across all datasets (iterations 3011). Duplicates considering the same neighborhoods can be removed in some options (cf. Eq. 4). Binning can be employed along the respective array dimension of the data structure for the complexity values to make the complexity values comparable for the counting across all datasets. An array data structure can be determined based on SHLQI$^2$ or HLQI$^2$, cf. Eq. 3 and 5.

As will be appreciated, the data structure corresponds to a histogram. This is because information—the frequency of occurrence of certain complexity values—is aggregated across all datasets. The frequency of occurrence itself does not include information regarding which specific datasets of all datasets contributed to the respective complexity value at the given neighborhood size.

Nonetheless, it is possible that the data structure also includes an identification of those datasets that are associated with the respective frequency of occurrence of the local complexity values. This means that for a given array entry, beyond the respective frequency of occurrence, also a list of all datasets that have been binned in the corresponding bin may be retained. Such information is helpful when subsequently assessing the plurality of datasets based on the data structure (as will be explained in greater detail below in connection with box 3040). Specifically, such information enables to select a certain subset of all subsets that is associated with a subsection of the array data structure. In other words, the user may select a certain set of bins/array entries of the data structure; this then enables a query which datasets contributed to those bins, by considering the above-discussed identification of datasets also stored in the data structure. It would then be possible to control the user interface to output information associated with this subset of datasets. Details regarding how to make use of the data structure are disclosed next in connection with box 3040.

According to various examples, it would be possible to save the data structure for later use. It would also be possible, alternatively or additionally, to commence at box 3040 and/or box 3100. Box 3040 and 3100 (and the following boxes) are, accordingly, optional boxes. These boxes facilitate an assessment of the quality or complexity of the training data based on the data structures that has been previously determined in box 3035. Here, the data structure can be accessed, e.g., by plotting, comparing entries, checking entries, comparing against similar data structures constructed for other training data or validation data, identifying which specific datasets contributed to certain bins, etc. The quality or complexity of the training data can be manually assessed and/or automatically assessed. Thus boxes 3040 and following may optionally involve user actions.

It would generally be possible that box 3040 and following are executed during a training phase or data collection phase. Box 3040 could also be executed during inference and a result of the assessment of the data structure can be used to supervise inference tasks handled by a machine-learning algorithm. For instance, based on such assessment of the data structure, the inference task can be aborted, e.g., responsive to detecting a wrong prediction made by a machine-learning algorithm. An example will be explained in connection with FIG. 10.

For a manual assessment of the training data, it is helpful to access the data structure to plot the data structure. It is possible to determine a plot of the data structure. Here, a contrast of plot values of the plot is associated with the frequency of occurrence. For instance, a larger (smaller) frequency of occurrence can correspond to a darker (lighter) grey scale value of a grey scale plot. The plot can then be output via a user interface, e.g., the HMI 94 of the computing device 90.

Figure 4:
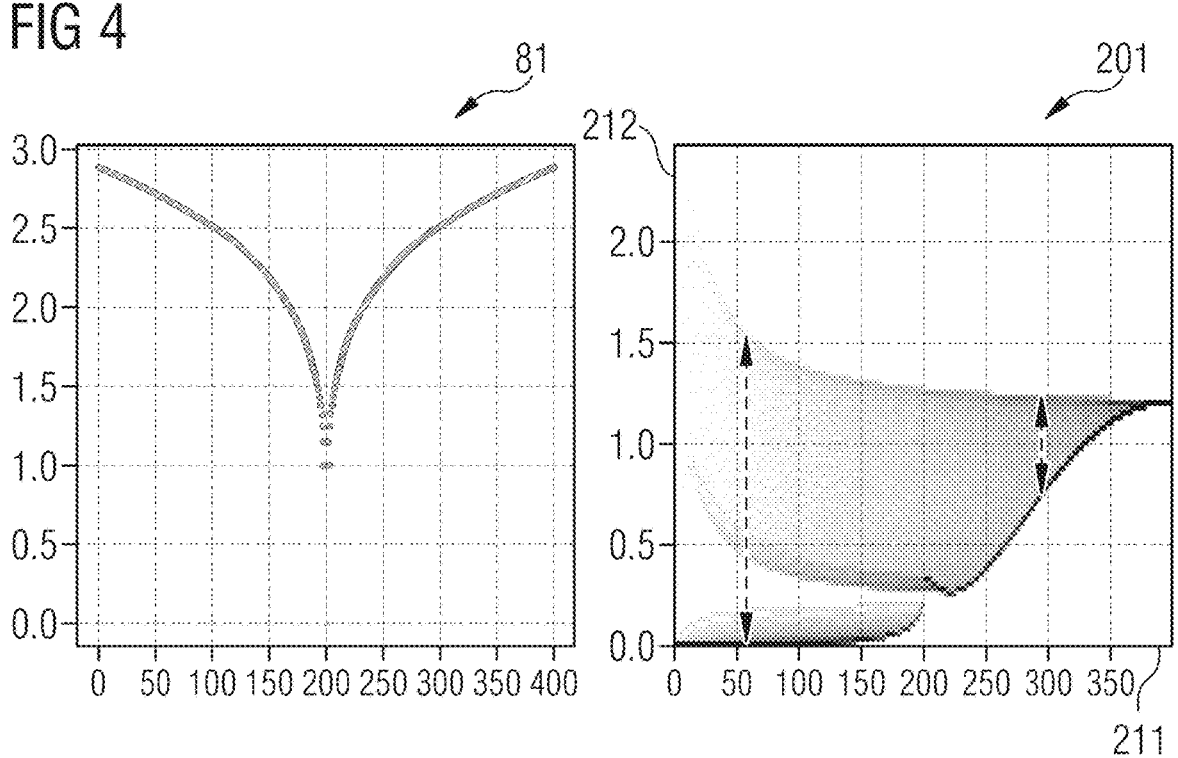
FIG. 4 schematically illustrates a plot of a data structure according to various examples.

An example is illustrated in FIG. 4. FIG. 4 includes the plot 81 of values of output datapoints over values of input datapoints of multiple datasets. FIG. 4 also includes a further plot 201 of the data structure determined based on SHLQI2. Here, the Y-axis 212 resolves the respective local complexity values (in a binned manner; in FIG. 4, SHLQI2 is plotted); while the x-axis 211 resolves the neighborhoods based on their sizes (here, KNN are used as neighborhoods; the x-axis 211 shows increasing k; this means that an increment of the x-axis 211 corresponds to the count of nearest neighbors, i.e., k=1,2,3, . . . ). Darker (lighter) contrast indicates higher (lower) frequency of occurrence across all datasets.

As can be seen from plot 201 of FIG. 4, the spread of observed complexity values is larger for small neighborhoods (left side of the x-axis 211) and smaller for large neighborhoods (right side of the x-axis 211); the spread is indicated by dashed arrows. I.e., the spread reduces with increasing sizes of the neighborhoods or, specifically, with increasing K. This is a general trend observed for the plot 201 for arbitrary collections of datasets. This trend is based on observing local neighborhoods for small values of K, wherein such local neighborhoods tend to have different complexity values. With increasing K, certain pairs of datasets are present in many respective neighborhoods; resulting in convergence of the complexity value towards a global limit. This convergence can be observed in plot 201 of FIG. 4 for sizes of K beyond 250 approximately.

The plot 201 is only one example of a graphical representation of the data structure. As a general rule, various options are available of configuring a plot of the data structure that is determined at box 3035. The plot 201 of FIG. 4 is only one example. For instance, the increment of the x-axis 211, in the example of FIG. 4, corresponds to the count of nearest neighbors, i.e., increments along with K for KNN neighborhoods. Such configuration of the x-axis 211 (or any axis that resolves the respective array dimension) is, in particular, helpful where the underlying data structure has an array dimension that also increments along with the number of nearest neighbors of KNN neighborhoods. However, as previously discussed in connection with Equation 2, defining the neighborhoods by KNNs is only one option. In other scenarios, an increment of the array dimension can also correspond to a predetermined distance measure in the input space, e.g., for progressively larger n-dimensional spheres defined in the input space having dimension n; then, in such a scenario it would also be possible that the x-axis of the respective plot is incrementing along with the predetermined distance in input space. Such plot enables to assess whether there are subsets of datasets that have input datapoints forming a cluster in the input space, where the clusters are separated in the input space from each other. For certain clusters in input space, it can be determined how large these clusters extend in the input space. Also, a density of input datapoints within a cluster in the input space can be assessed. The minimum distance between input datapoints leading to different classification results, i.e., having substantially different output datapoints can be assessed.

As will be appreciated from the above, various options exist for determining a plot of the data structure. Various options exist for configuring the plot. Based on such plot, the user can assess the training data.

The plot can be provided in an interactive manner. Details will be explained later in connection with FIG. 5 and FIG. 6.

Referring once more to FIG. 3, once the training data has been analyzed at box 3040, it would be possible to refine the training data at optional box 3045. For instance, certain datasets may be removed from the training data, e.g., because they are faulty. An annotation process may be guided accordingly.

Another option for refining the training data would be based on adjusting a partitioning into training data and validation/test data performed at box 3005. I.e., where a collection of datasets has been partitioned into training data and validation/test data, this partitioning can be adjusted. For example, it would be possible to compare the data structure determined for the training data with a corresponding data structure determined for the validation data/test data (i.e., the preceding boxes can be executed also for the validation/test data, to obtain a similar data structure). If significant deviations between the first data structure determined for the training data and the second data structure determined for the validation data/test data are detected, then, the partition is faulty. This is because the training data does not adequately sample input space/output space dependencies to be validated by the validation or test data. Such comparison between the first and second data structure can be executed on multiple levels. For example, a local comparison can be executed for individual bins. Deviations between the entries associated with certain bins can be compared to a predetermined threshold. Further, a global comparison can be executed across multiple bins, e.g., using techniques of descriptive statistics.

As a further measure of refining the training data at box 3045, further datasets could be acquired using different sensors. Thus, the measurement principle underlying the acquisition of the datasets may be varied. A data acquisition plan can be adjusted. Such techniques are helpful where certain deficiencies in the test data are detected based on the analysis, such deficiencies being rooted in the underlying measurement/data acquisition. To give a concrete example: for instance, it would be possible to detect high complexity of the training data, i.e., a small change in the position in the input space can result in a significant change in the position in the output space. Thus, a prediction boundary in the input space can be blurry or very narrow. Then, it can be judged that such high complexity of the training data prevents robust inference. To mitigate this, the construction of the datasets can be re-configured and new training data can be acquired for the new configuration of the datasets. For instance, one or more features can be added to the datasets, e.g., further sensor data can be included (this would increase the dimensionality of the datasets). It would also be possible to reconfigure the types of sensors used for the acquisition of the datasets, e.g., use a sensor having lower noise level, rearrange an arrangement of the sensors in a scene, etc.

Then, at optional box 3050, upon assessing the quality of the training data (and upon optionally refining the training data), it is possible to train the classification algorithm based on the (optionally refined) training data.

At box 3055 it would then be optionally possible to use the machine learning algorithm for solving inference tasks based on the training. Based on such inference tasks, a machine may be controlled.

Above, with respect to box 3015 through box 3055 techniques have been disclosed that facilitate assessment of a collection of datasets, e.g., forming training data. Such assessment can be executed prior to training or as part of the overall training process of a machine-learning algorithm. According to some examples, it is also possible to employ the data structure as part of an inference process. This is illustrated next in connection with box 3100 and following.

At box 3100 an input datapoint for which an inference is to be made is obtained. The input datapoint can thus be referred to as inference input datapoint.

A machine-learning algorithm determines, at box 3105, an inference output datapoint based on the input datapoint. The machine-learning algorithm is pre-trained using a collection of datasets forming training data, e.g., based on the training data obtained at box 3005.

It is then possible, using the disclosed techniques, to test whether an inference task provided by the machine-learning algorithm is reliable or unreliable for the inference input datapoint. For instance, if the inference task is judged to be unreliable, the inference output datapoint can be marked as unreliable. For instance, if the inference task provided by the machine-learning algorithm is used to implement controller functionality for a technical system, the technical system could be transitioned into a safe state. A warning message could be output.

Supervision of the machine-learning algorithm is implemented based on the data structure determined at box 3035.

In detail, it is possible to retain a representation of the training data (cf. box 3005) as well as the data structure determined based on the training data (box 3010). Then, based on the inference input datapoint and the inference output datapoint, it is possible to determine the trace of local complexity indicators for neighborhoods of the inference input datapoint with respect to the datasets included in the training data as previously explained in connection with box 3010 and following. Thus, the relative arrangement of the inference input datapoint is assessed with respect to input datapoints of the training data. This is done at box 3110.

As part of box 3110, multiple local complexity indicators can be determined for multiple neighborhoods of the inference input datapoint. These multiple neighborhoods are defined in the input space. The multiple neighborhoods have different sizes, e.g., can be progressively larger. KNN neighborhoods may be selected with increasing k. Any given local complexity indicator is then based on differences between input distances and output distances, the input distances being in the input space between the inference input datapoint and input datapoints of the datasets of the training data, whereas the output distances are in the output space between the inference output datapoint and the output datapoints of the datasets of the training data in the respective neighborhood. This yields a trace of local complexity indicators.

Then, at box 3115, a comparison between the trace of the local complexity indicators of the inference input datapoint and the inference output datapoint with respect to the training data and the previously determined data structure associated with the training data is executed.

At box 3120, based on the comparison, the inference output datapoint can be selectively marked as reliable or unreliable.

There are various options available for implementing the comparison. For instance, patterns in the plot of the data structure can be visually compared to the trace, to see whether the shape of the trace matches such pattern. It would also be possible to determine whether the values of the frequency of occurrence of the local complexity values in bins visited by the trace are not smaller than a certain threshold.

Next, some specific details of possible assessments to be executed as part of box 3020 will be disclosed. For instance, an assessment of complexity of the training data can be executed. This can include determining clusters of input datapoints in input space. This can include determining highly complex inference tasks, e.g., where input datapoints are situated closely together in the input space but have significantly deviating output datapoints, i.e., equal pairs of input datapoints and unequal pairs of output datapoints are assessed. This can also include detection of regions in the input space that correspond to superimposed output datapoints. For instance, input datapoints that are equal in input space can be associated with unequal output datapoints. Two or more classes for a classification task can be superimposed. Assessment of the complexity of the training data can also include assessing the "change behavior" of the underlying model assumption of mapping input space to output space, i.e., how a certain change of the position in the input space results in a change of the position in the output space. Assessing the complexity can also include determining regions in input space that correspond to simple inference tasks. For instance, it would be possible to determine regions in input space where all corresponding output datapoints are equal in output space, depending on the respective output neighborhood criterion. Such simple inference tasks cannot be associated with a linear mapping from input space to output space, e.g., for regression tasks.

Assessing the complexity can also include determining inherent noise in the training data, e.g., leading to statistical fluctuation of the position in input space and/or the position in output space. Likewise, periodic behavior of the input datapoints and/or the output datapoints can be identified when assessing the complexity of the training data. Borders in between different output classes can be identified when assessing the complexity of the training data.

Alternatively or additionally to the assessment of the complexity of the training data, it would also be possible to assess the quality of the training data. For instance, outliers may be determined. Inconsistent datasets can be identified. Noise associated with the acquisition of data underlying the input datapoints and/or the output datapoints can be identified. Continuity of the position in output spaces depending on the position in input space can be assessed. It can be checked whether the input space is evenly sampled. Wrong classifications, i.e., erroneous output datapoints can be identified. Unequal sampling of the output space can be identified.

Next, a few specific examples of such assessments will be given.

Figure 5:
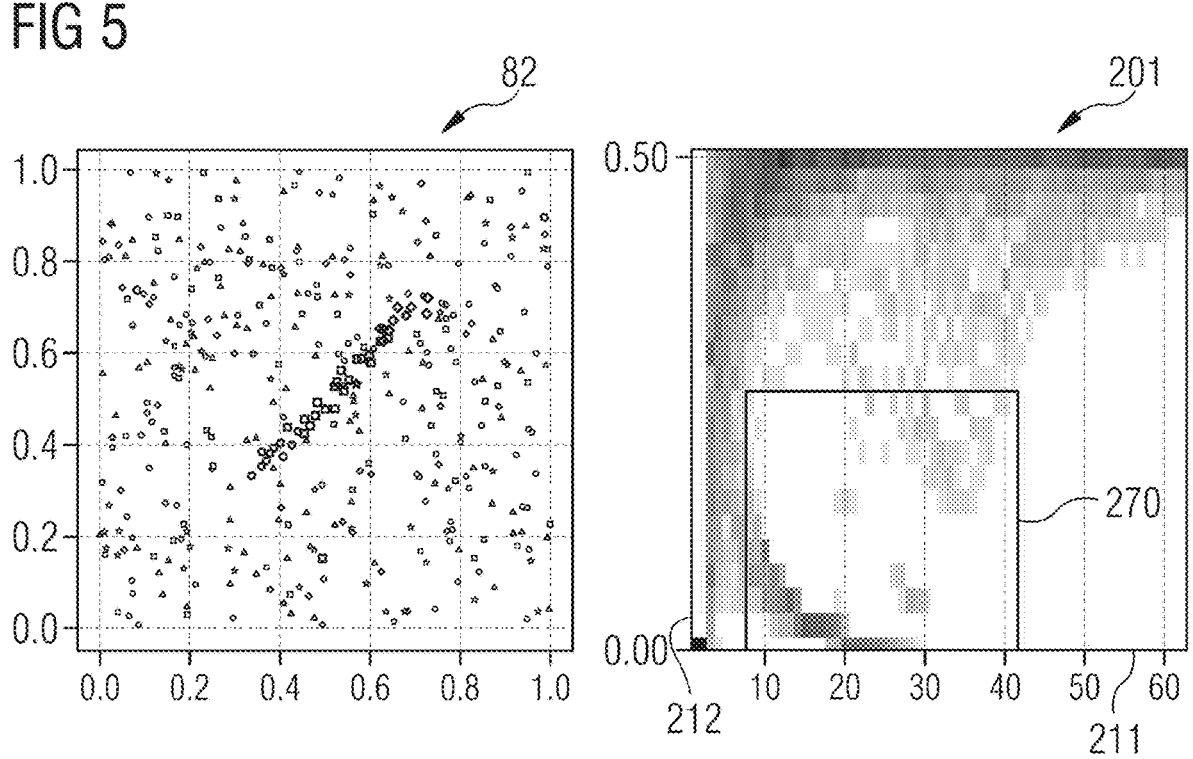
FIG. 5 schematically illustrates a plot of a data structure according to various examples.

For instance, illustrated in connection with FIG. 5 are techniques that enable identifying simple inference tasks from amongst multiple datasets. This corresponds to assessing the complexity.

Assessing the training data for simple inference tasks is based on the finding that the count of datasets that are required for training a machine-learning system can tend to increase significantly with increasing complexity of the task. Thus, complexity of relationships of datasets with respect to each other can increase. However, it is possible that beyond such complex relationships there are also simple relationships hidden in the multiple datasets. For instance, simple relationships could pertain to a linear or mostly linear dependency of output datapoints on input datapoints. Such simple subtasks can be used for stabilizing, increasing safety and explaining behavior of a machine-learning algorithm.

Now referring to FIG. 5, there is illustrated the plot 201 for a certain collection of datasets: The plot 82 of FIG. 5 illustrates these datasets. The plot 82 corresponds to a two-dimensional representation of the position of the input datapoints of the datasets in the input space (x-axis and y-axis); the grayscale encodes the output classification, i.e., the output datapoints. For instance, the input datapoints can have a dimensionality that is larger than 2; to nonetheless provide a 2-D plot 82, a dimensionality reduction, e.g., using UMAP may be used.

FIG. 5 illustrates a selection of a part 270 of the plot 201. Thereby, a subset of the datasets associated with this part 270 is selected, i.e., those datasets that have respective neighborhoods contributing to the plot value in the respective part 270 (it is possible to resolve/identify these datasets if the data structure based on which the plot 201 is determined also includes an identification of those datasets that are associated with a respective frequency of occurrence of the local complexity values of each bin).

A user may generally freely select different parts by interacting via the GUI. The part 270—in the specific illustrated example—is selected for comparatively small neighborhoods, i.e., up to a predetermined threshold of k=42; as well as complexity values up to a certain threshold. This means that datasets are selected that have in their closer neighborhoods comparatively small complexities: these datasets constitute a linear dependency between input and output datapoints.

As a general rule, upon a certain subset of datasets has been selected, the user interface is controlled to output information associated with the respectively selected subset of datasets that contribute to the plot values in the selected part 270. This behavior is enabled by keeping track of the datasets in the data structure underlying the plot 201 that are responsible for a certain histogram value. In other words, each entry of the array data structure can include an identification of the datasets that are associated with the respective frequency of occurrence of the local complexity values.

As a general rule, there are various options available for outputting information associated with the respective selected subset. For instance, it would be possible to output a list of all datasets that are associated with the selected subset. In a further example, it would be possible to provide the information to an annotation interface. This would enable a user to check whether ground truth labels (i.e., the output datapoints) have been correctly assigned. This can be helpful where the subset corresponds to outliers or specific tasks of low complexity. It can be helpful to check that such outliers or low-complexity sub-tasks are not due to measurement errors or inaccuracies in the acquisition of the test data.

In the illustrated example, these datasets are highlighted in the plot 82. Accordingly, as a general rule, it is possible to control the user interface to output a plot that resolves positions of input datapoints of the datasets in the input space and then highlight those input datapoints that are part of a selected subset of all datapoints, the subset being determined by making a respective selection in the plot 201 of the local complexity values.

As will be appreciated, thereby an interactive behavior between the plot 201 and the plot 82 can be achieved. The user can select certain parts in the plot 201 and based on this selection identify which datasets contribute to the respective contrast of that selected part of the plot 201, by observing the plot 82 and which datasets are highlighted there responsive to the selection. Such interaction can also be implemented in the other direction: the user may select certain datasets in the plot 82 and then those parts of the plot 201 that are affected by those datasets selected in the plot 201 can be highlighted.

Summarizing, above a scenario has been discussed in connection with FIG. 5 that enables to identify a simple inference task from amongst a complex collection of datasets. This scenario has been used to exemplify how a user can select a certain subset of datasets from amongst the collection and how information regarding this subset is then provided to the user. In the illustrated example, the specific subset that is selected corresponds to those datasets that have a simple inference task. However, as a general rule, the techniques of selecting a certain subset from amongst the collection of datasets can be applied to solve various other kinds and types of problems when assessing the collection of datasets, beyond low-complexity sub-tasks. One further example for assessing the collection of datasets by selecting an appropriate subset is explained in connection with FIG. 6.

Figure 6:
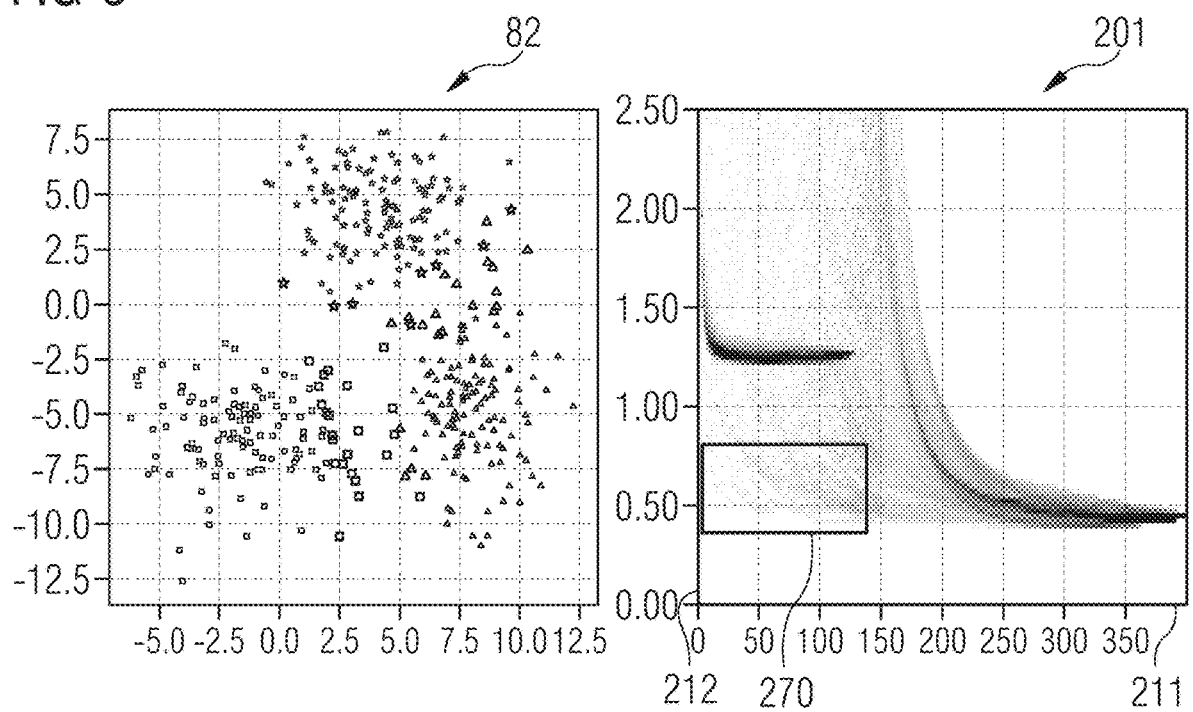
FIG. 6 schematically illustrates a plot of a data structure according to various examples.

FIG. 6 schematically illustrates an application of the plot 201 to identify feature space decision boundaries. A feature space decision boundary constitutes a delimitation between two different classes for training of a classification machine-learning algorithm. Often a feature space decision boundary can be modeled or described by a mathematical function, also referred to as decision function. Depending on the distribution of datasets along a feature space decision boundary, training of the classification machine-learning algorithm to correctly predict the classes for input datapoints located close or at the decision boundary can be comparatively difficult. Further, not only the complexity of the training is affected by the distribution of the datasets along the feature space decision boundary, but also the quality of the trained differentiation. The quality of the differentiation/distinction made by the machine-learning algorithm. For instance, there can be a situation where input datapoints associated with output datapoints of different classes are arranged in an interleaved manner in the input space. I.e., there is no well-defined feature space distinction boundary. Then, classification made by the classification machine-learning algorithm can be erroneous when operating close to the feature space decision boundary.

According to examples, it is possible to determine features which are located close to a feature space decision boundary. To achieve this, it is possible to select a subset of the plurality of datasets by selecting a subsection of the data structure. This is illustrated in FIG. 6 for a certain part 270—associated with a user selection of the corresponding subsection of the underlying data structure—is selected by the user. Here, all neighborhoods below a certain threshold (in the illustrated example roughly up to k=140 for KNN neighborhoods) having comparatively low complexity (i.e., local complexity values below a certain threshold) are selected. Due to the construction of the local complexity value (SHLQI$^2$) this area having comparatively low complexity corresponds to input datapoints that have nearest neighbor input datapoints of datasets that are associated with different classes (described by their output datapoints). These input datapoints are highlighted in the plot 82.

Figure 7:
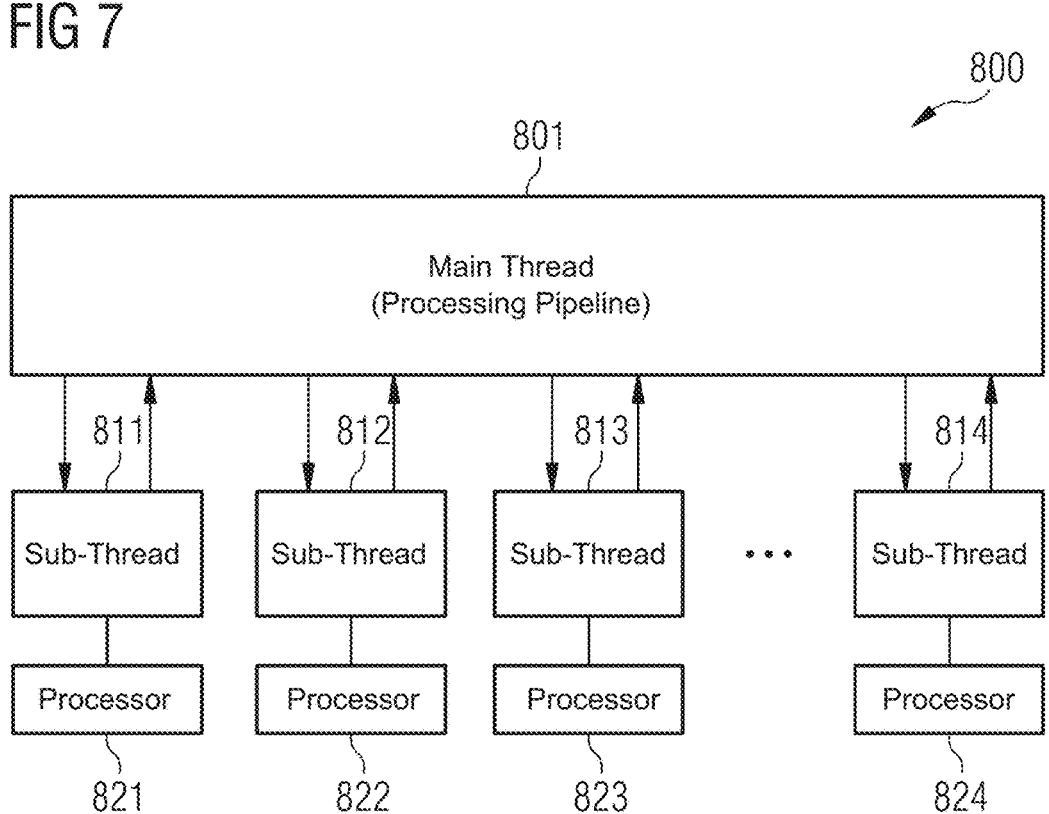
FIG. 7 schematically illustrates parallel processing when computing a data structure according to various examples.

FIG. 7 schematically illustrates aspects with respect to a processing pipeline implemented to determine the data structure. The processing pipeline 800 can be used to execute boxes 3010, 3015, 3020, 3025, 3030, and 3035 of the method of FIG. 3. The processing pipeline enables calculations for determining the multiple local complexity indicators based on which the data structure is determined to be distributed across multiple processing devices 821-824. The multiple processing devices can be compute units of a graphics processing unit or multiple GPUs. A main thread 801 is used to determine which local complexity values are to be assigned to which sub-thread 811-814. The sub-threads manage the respective compute units 821-824. The distribution of calculations across the sub-threads 811-814 can be based on one or more criteria, e.g.: all calculations for a given dataset to be assigned to a given sub-thread 811-814; load-balancing.

The main thread then hands over corresponding data to the sub-threads 811-814 and combines the results obtained from the sub-threads after determining the local complexity values to a final result.

Using such techniques as explained above in connection with the processing pipeline 800 can help to reduce the time required to determine the data structure by accelerating the respective matrix operations using GPU technology.

Figure 8:
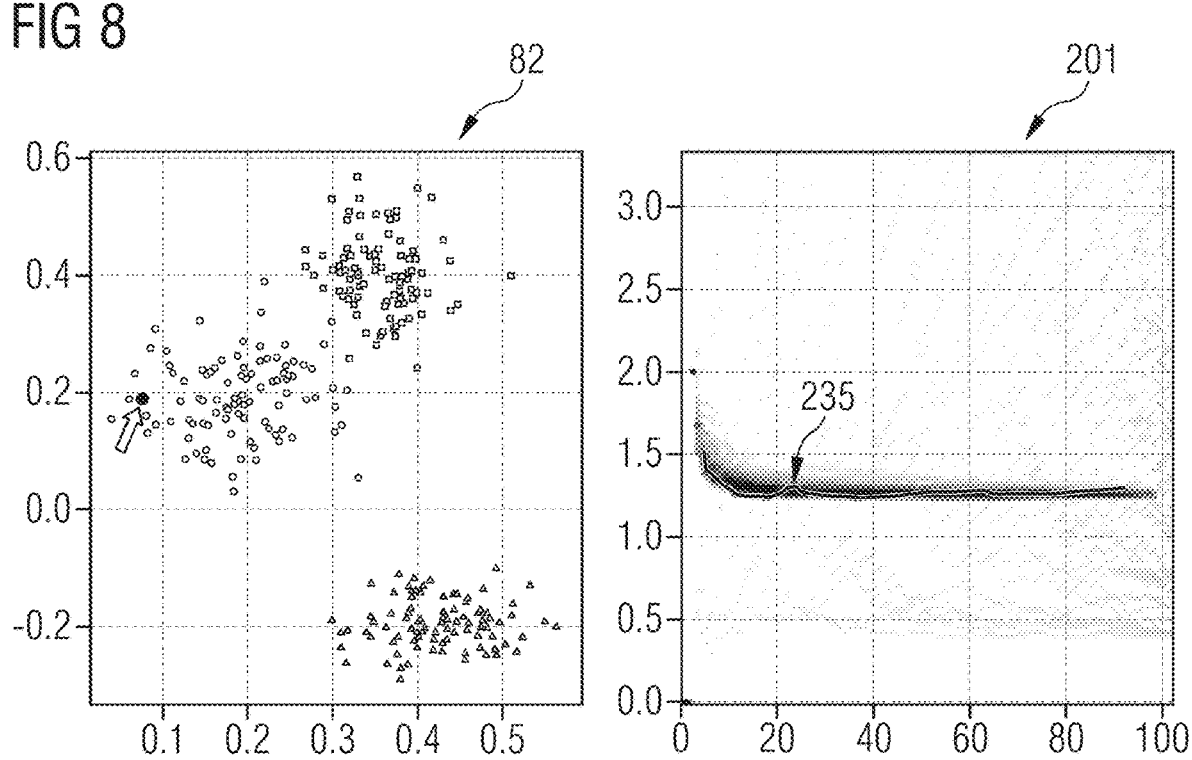
FIG. 8 schematically illustrates a plot of a data structure according to various examples.
Figure 9:
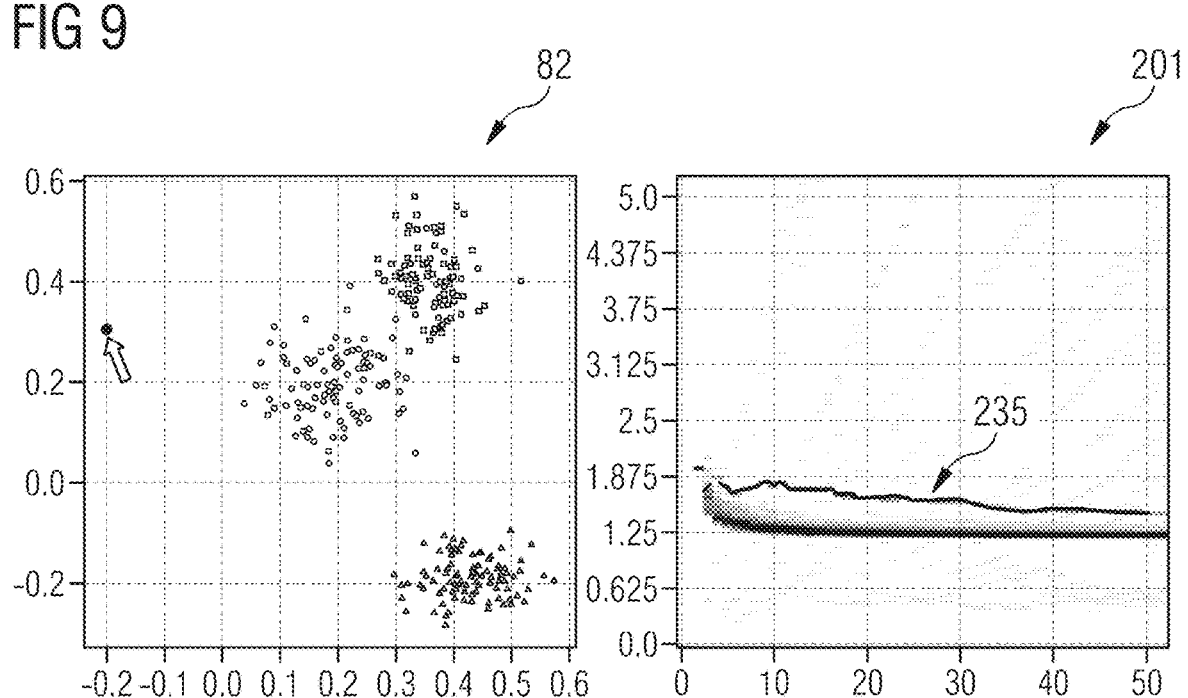
FIG. 9 schematically illustrates a plot of a data structure according to various examples.

FIG. 8 and FIG. 9 schematically illustrate a process that enables to detect any out-of-distribution datapoints and/or allows to judge whether datapoints are in-distribution. For instance, techniques associated with FIG. 8 could be executed as part of box 3100 and following (cf. FIG. 3). These techniques can accordingly be used during inference to detect unreliable predictions made by a machine-learning algorithm. In case an unreliable prediction is detected, the system that is controlled by the prediction of the machine-learning algorithm can be transitioned to a safe state. A warning could be output. User interaction can be queried. These are only some examples and other actions are conceivable.

Illustrated in FIG. 8 is the plot 201 of the data structure as previously discussed for training data. A representation of these datasets is retained, together with the data structure determined at box 3035. A respective data collection includes the representation of the datasets of the training data and the data structure, e.g., SHLQI2. Based on this data collection, it is possible—at inference—to determine an SHLQI2 trace for a new inference input datapoint—inference output datapoint pair and judge whether the inference output datapoint is reliable. This was explained above in connection with FIG. 3: box 3100 through box 3120.

The training data is illustrated in plot 82 of FIG. 8. Also illustrated is the considered inference datapoint (marked in the plot 82 using the arrow) and the corresponding trace 235 of the local complexity indicators determined for the inference datapoint. As illustrated in FIG. 8, the pattern of the trace 235 matches the primary pattern in the project 201. I.e., bins visited by the trace have comparatively large values for the frequency of occurrence of these local complexity values. Bins visited by the trace 235 have high SHLQI2 values.

Accordingly, it can be judged that the inference datapoint is not out of distribution. The inference datapoint behaves similarly to what has been observed in the training data. Accordingly, it would be possible to label the respective inference output datapoint as reliable at box 3120 during inference.

This is different in the scenario FIG. 9. Here, another inference input datapoint—an outlier—is considered. The corresponding trace 235 significantly deviates from the primary pattern of the part 201 of the data structure. The bins 235 visited by the trace 235 of that datapoint have comparatively small values for the frequency of occurrence of the local complexity values; e.g., small values of SHLQI2. Accordingly, it would be possible to label the respective inference output datapoint as unreliable at box 3120 during inference.

Figure 10:
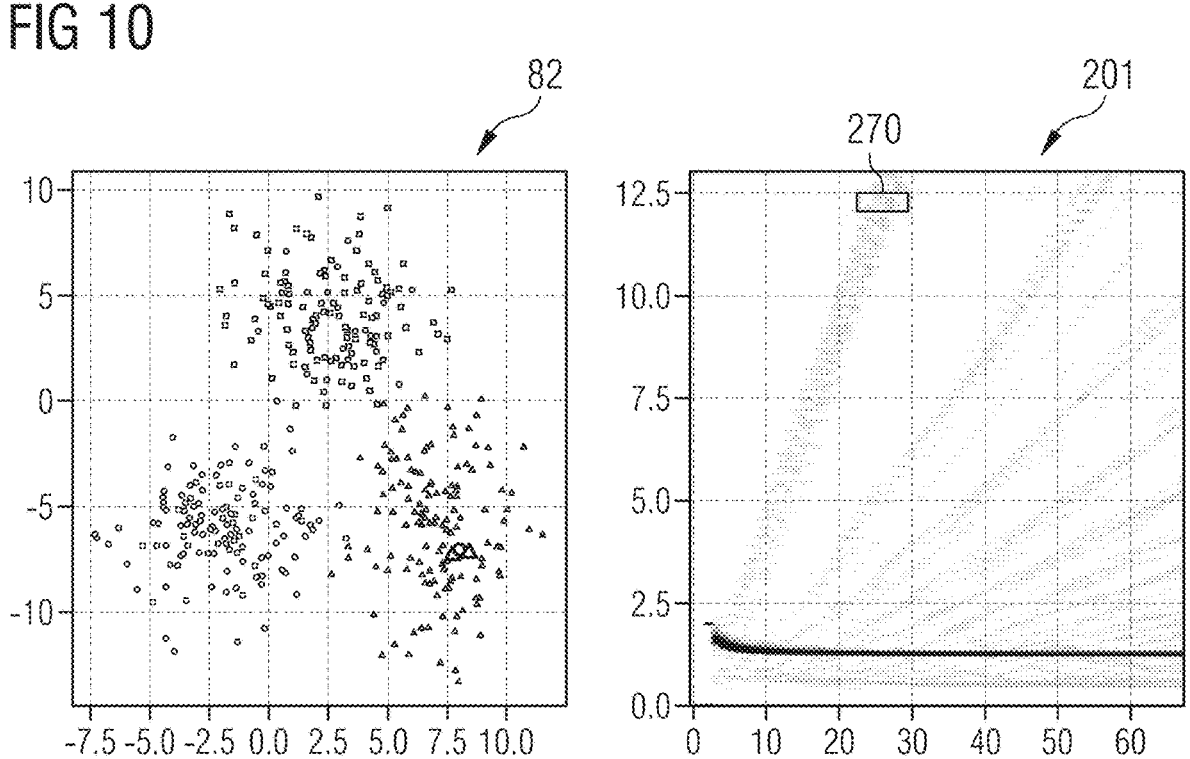
FIG. 10 schematically illustrates a plot of a data structure according to various examples.

Next, examples with respect to detecting wrong classifications for a classification machine-learning algorithm are disclosed in connection with FIG. 10. A wrong classification corresponds to an inference input datapoint processed by the classification machine-learning algorithm to yield an inference output datapoint that is indicative of the objectively wrong class. Such wrong predictions can be safety critical during inference, e.g., where a technical system that is controlled by the output of the classification machine-learning algorithm takes wrong actions. Accordingly, it is possible to apply the techniques disclosed hereinafter during inference.

To detect a wrong classification, the array data structure can be used (cf. FIG. 3: box 3035). Specifically, $SHLQI^2$ can be used. An example will be disclosed in connection with $SHLQI^2$.

In a first scenario, consider a given input datapoint (e.g., an inference input datapoint obtained during inference) that has further input datapoints in its neighborhood(s) that are all associated with output datapoints indicative of the same class as the given input datapoint. In this case, the considered neighborhoods are homogeneous. The $SHLQI^2$ of the given input datapoint in this case has an output value of 1.1 (it is noted that the $SHLQI^2$ has this value for all datapoints in the considered set, because all datasets face the same situation). This value does not change as a function of the neighborhood size, because the complexity does not change.

In a second scenario, consider a given input datapoint that has further input datapoints in its neighborhoods that all have different output datapoints indicating different classes as the given input datapoint (i.e., different predictions). Then, the given input datapoint is surrounded by input datapoints having different output classes. This means that the local complexity value significantly increases beyond 1.1 as in the first scenario outlined above. This increase continues up to a point where the considered neighborhood is finally so large that another input datapoint is included that has an associated output datapoint associated with the same class as the given input datapoint.

In a third scenario, the given datapoint has a neighborhood which has an input datapoint having an associated output datapoint associated with the same class as the given output datapoint, as well as another input datapoint having an associated output datapoint associated with a different class. This is a transition case between the two scenarios outlined above. After an initial increase of the local complexity value for the considered datapoint, the local complexity value decreases again.

A wrong prediction is observed for the second scenario above. This wrong prediction is typically more critical for smaller distances to the surrounding datapoints in the input space. This is the case because areas of the input space having many input datapoints are typically required to have reliable predictions by the classification machine-learning algorithm, because they tend to occur often during inference.

To detect inference input datapoints matching the second scenario outlined above, it is possible to select the part 270 of the plot 201 as illustrated in FIG. 10. This is based on the following finding. The simplest scenario within the $SHLQI^2$ is a linear arrangement of datapoints. If a datapoint deviates and the predicted class with respect to its neighbors, this is a linear dependency. If the nearest neighbor has the identical class as the associated output datapoint this results in a different normalized input distance with respect to the normalized output distance. This is because the normalization of the output distance creates a division by 0. Thus, the $SHLQI^2$ equates 2.0. Thus, the part 235 selects all high complexity values, together with complexities that are 0 for the nearest neighbors (KNN neighborhoods k=2). These high complexity values are selected for sufficiently large neighborhoods, e.g., k>20 (because else the probability of considering datapoints along a decision boundary is comparatively large).

Such check can be automated during inference by considering a batch inference input datapoints in calculating $SHLQI^2$ the data structure during inference. I.e., an inference task provided by a machine-learning algorithm can be supervised based on assessing the $SHLQI^2$ data structure. It would then be possible to selectively abort the inference task based on such assessing, e.g., when detecting a wrong prediction. It would be possible to transition a technical system that is controlled based on such monitoring to a safe state. For instance, if autonomous train control is proved as the inference task, the train may be decelerated (emergency braking), to give one example.

Responsive to detecting a wrong prediction, a technical system controlled based on the output of the machine-learning algorithm can be transitioned to a safe state.

In summary, the following exemplary embodiments of the invention have been described:

Example 1

A computer-implemented method of enabling assessment of a plurality of datasets, each dataset of the plurality of datasets comprising a respective input datapoint in an input space and an associated output datapoint in an output space, wherein the method comprises:
for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood,
determining an array data structure comprising at least a array dimension and a further array dimension, the array dimension resolving the multiple neighborhoods based on their sizes, the further array dimension resolving the local complexity values, entries of the array data structure being indicative of a frequency of occurrence of the respective local complexity values at the respective size of the neighborhoods across all datasets of the plurality of datasets,
controlling a user interface to provide access to the array data structure,
controlling the user interface to receive a user selection of a subsection of the array data structure,
selecting a subset of the plurality of datasets associated with the subsection, and
controlling the user interface to output information associated with the subset of the plurality of datasets.

Example 2

The computer-implemented method of EXAMPLE 1, wherein each entry of the array data structure further comprises an identification of the datasets that are associated with the respective frequency of occurrence of the local complexity values.

Example 3

The computer-implemented method of EXAMPLE 1 or 2, wherein the user interface is controlled to output a plot (201)

of the array data structure, wherein a first axis (211) of the plot (201) corresponds to the array dimension, wherein a second axis (212) of the plot (201) corresponds to the further array dimension.

Example 4

The computer-implemented method of any one of the preceding examples, wherein the user interface is controlled to output a further plot (82) indicative of positions of the input datapoints of the plurality of datasets in the input space, the input datapoints of the datasets in the subset being highlighted in the further plot (82).

Example 5

The computer-implemented method of any one of the preceding examples, wherein the user interface is controlled to provide the information associated with the datasets included in the subset to an annotation interface of the user interface.

Example 6

The computer-implemented method of any one of the preceding examples, wherein the multiple neighborhoods associated with any dataset of the plurality of datasets are defined to include a respective count of nearest neighbors of the input datapoint of the respective dataset in the input space, and wherein an increment of the array dimension corresponds to the count of nearest neighbors.

Example 7

A computer-implemented method of enabling assessment of a plurality of datasets, each dataset of the plurality of datasets comprising a respective input datapoint in an input space and an associated output datapoint in an output space, wherein the method comprises:
  for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood,
  determining an array data structure comprising at least a array dimension and a further array dimension, the array dimension resolving the multiple neighborhoods based on their sizes, the further array dimension resolving the local complexity values, entries of the array data structure being indicative of a frequency of occurrence of the respective local complexity values at the respective size of the neighborhoods across all datasets of the plurality of datasets,
  wherein an increment of the array dimension corresponds to a predetermined distance in the input space.

Example 8

A computer-implemented method of enabling assessment of a plurality of datasets, each dataset of the plurality of datasets comprising a respective input datapoint in an input space and an associated output datapoint in an output space, wherein the method comprises:
  for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood,
  determining an array data structure comprising at least a array dimension and a further array dimension, the array dimension resolving the multiple neighborhoods based on their sizes, the further array dimension resolving the local complexity values, entries of the array data structure being indicative of a frequency of occurrence of the respective local complexity values at the respective size of the neighborhoods across all datasets of the plurality of datasets,
  wherein calculations for said determining of the multiple local complexity indicators and/or said determining of the array data structure are distributed across multiple processing devices.

Example 9

The computer-implemented method of EXAMPLE 8, wherein the multiple processing devices are part of a graphics processing unit.

Example 10

A computer-implemented method of enabling assessment of a plurality of datasets, each dataset of the plurality of datasets comprising a respective input datapoint in an input space and an associated output datapoint in an output space, wherein the method comprises:
  for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood,
  for each dataset of the plurality of datasets: while executing calculations for said determining of the respective multiple local complexity indicators, selectively aborting at least a part of the calculations prior to determining the respective multiple local complexity indicators for all of the multiple neighborhoods associated with the respective dataset, and
  determining an array data structure comprising at least a array dimension and a further array dimension, the array dimension resolving the multiple neighborhoods based on their sizes, the further array dimension resolving the local complexity values, entries of the array data structure being indicative of a frequency of occurrence of the respective local complexity values at the respective size of the neighborhoods across all datasets of the plurality of datasets.

Example 11

The computer-implemented method of EXAMPLE 10, wherein said selectively aborting is based on a probability that is progressively increased as the calculations progressively cover neighborhoods having larger sizes.

Example 12

A computer-implemented method of enabling assessment of a plurality of datasets, each dataset of the plurality of datasets comprising a respective input datapoint in an input space and an associated output datapoint in an output space, wherein the method comprises:
for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood,
determining an array data structure comprising at least an array dimension and a further array dimension, the array dimension resolving the multiple neighborhoods based on their sizes, the further array dimension resolving the local complexity values, entries of the array data structure being indicative of a frequency of occurrence of the respective local complexity values at the respective size of the neighborhoods across all datasets of the plurality of datasets,
wherein each entry of the array data structure further comprises an identification of the datasets that are associated with the respective frequency of occurrence of the local complexity values.

Example 13

The computer-implemented method of EXAMPLE 12, wherein the plurality of datasets form training data of a machine-learning algorithm.

Example 14

The computer-implemented method of EXAMPLE 13, accessing the data structure to assess the training data.

Example 15

The computer-implemented method of EXAMPLE 12, wherein the plurality of datasets for inference data obtained from an inference task provided by a machine-learning algorithm,
wherein the method further comprises:
accessing the data structure to assess the inference data,
based on said assessing the data structure, selectively aborting the inference task.

Example 16

The computer-implemented method of EXAMPLE 15, further comprising:
controlling a technical system based on the inference task,
selectively transitioning the technical system to a safe state when aborting the inference task.

Example 17

A computer-implemented method of supervising inference tasks provided by a machine-learning algorithm, the method comprising:
predicting, by the machine-learning algorithm, an inference output datapoint based on an inference input datapoint,
determining multiple local complexity indicators for multiple neighborhoods of the inference input datapoint in an input space, the multiple neighborhoods having different sizes, any given local complexity indicator being based on differences between input distances and output distances, the input distances being in the input space between the inference input datapoint and input datapoints of a plurality of datasets in the respective neighborhood, the output distances being in the output space between the inference output datapoint and the output datapoints of the plurality of datasets in the respective neighborhood, thereby obtaining a trace of local complexity indicators,
performing a comparison between the trace of the local complexity indicators and the array data structure determined in accordance with EXAMPLE 12, and
based on the comparison, selectively marking the inference output datapoint as reliable or unreliable.

Example 18

The computer-implemented method of EXAMPLE 17, wherein the plurality of datasets for training data based on which the machine-learning algorithm has been trained.

Example 19

A computing device (90) comprising a processor and a memory, the processor being configured to load program code from the memory and execute the program code, wherein the processor is configured to execute the method of any one of the preceding examples based on executing the program code.

Example 20

A computer program comprising product code executable by at least one processor, wherein the processor is configured to execute the method of any one of the above EXAMPLEs 1 to 11 or EXAMPLE 17 based on executing the program code.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, various aspects have been disclosed in connection with a plurality of datasets that form training data. Similar techniques may be readily employed for a plurality of datasets that form validation data or test data or even inference data (for supervising an inference task provided by a machine-learning algorithm).

For further illustration, various examples have been disclosed for classification tasks. Here, positions of output data points in the output space can take certain discrete values. However, similar techniques as disclosed herein can be readily applied to regression tasks.

The invention claimed is:

1. A computer-implemented method of enabling an assessment of a plurality of datasets, each dataset of the plurality of datasets including a respective input datapoint in an input space and an associated output datapoint in an output space, the method comprising:
for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood;
determining an array data structure having at least a first array dimension and a second array dimension, the first array dimension resolving the multiple neighborhoods based on sizes thereof, the second array dimension resolving values of the local complexity indicators in a binned manner, wherein entries of the array data structure are indicative of a frequency of an occurrence of the values of the respective local complexity indicators at a respective size of the neighborhoods across all datasets of the plurality of datasets;
controlling a user interface to provide access to the array data structure;
controlling the user interface to receive a user selection of a subsection of the array data structure;
selecting a subset of the plurality of datasets associated with the subsection; and
controlling the user interface to output information associated with the subset of the plurality of datasets;
wherein the plurality of datasets define inference data and are obtained from an inference task provided by a machine-learning algorithm, and the method further comprises:
accessing the array data structure to assess the inference data;
controlling a technical system based on the inference task;
aborting the inference task in response to detecting a wrong prediction based on an assessment of the array data structure; and
when performing the aborting of the inference task, selectively transitioning the technical system to a safe state.

2. The computer-implemented method according to claim 1, wherein each entry of the array data structure further comprises an identification of the datasets that are associated with the frequency of the occurrence of the values of the respective local complexity indicators.

3. The computer-implemented method according to claim 1, which comprises controlling the user interface to output a plot of the array data structure, with a first axis of the plot corresponding to the first array dimension, and a second axis of the plot corresponding to the second array dimension.

4. The computer-implemented method according to claim 1, which comprises controlling the user interface to output a further plot indicative of positions of the input datapoints of the plurality of datasets in the input space, with the input datapoints of the datasets in the subset being highlighted in the further plot.

5. A computer-implemented method of enabling an assessment of a plurality of datasets, each dataset of the plurality of datasets including a respective input datapoint in an input space and an associated output datapoint in an output space, the method comprising:
for each dataset of the plurality of datasets: determining multiple local complexity indicators for multiple neighborhoods of the input datapoint of a respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood;
determining an array data structure having at least a first array dimension and a second array dimension, the first array dimension resolving the multiple neighborhoods based on sizes thereof, the second array dimension resolving the values of local complexity indicators in a binned manner, wherein entries of the array data structure are indicative of a frequency of an occurrence of the values of respective local complexity indicators at a respective size of the neighborhoods across all datasets of the plurality of datasets;
wherein an increment of the first array dimension corresponds to a predetermined distance in the input space; and
wherein the plurality of datasets define inference data and are obtained from an inference task provided by a machine-learning algorithm, and the method further comprises:
accessing the array data structure to assess the inference data;
controlling a technical system based on the inference task;
aborting the inference task in response to detecting a wrong prediction based on an assessment of the array data structure; and
when performing the aborting of the inference task, selectively transitioning the technical system to a safe state.

6. A computer-implemented method of enabling an assessment of a plurality of datasets, each dataset of the plurality of datasets including a respective input datapoint in an input space and an associated output datapoint in an output space, the method comprising:

for each dataset of the plurality of datasets: determining multiple local complexity indicators for multiple neighborhoods of the input datapoint of a respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood;

determining an array data structure having at least a first array dimension and a second array dimension, the first array dimension resolving the multiple neighborhoods based on sizes thereof, the second array dimension resolving the values of local complexity indicators in a binned manner, wherein entries of the array data structure are indicative of a frequency of an occurrence of the values of the respective local complexity indicators at a respective size of the neighborhoods across all datasets of the plurality of datasets; and distributing calculations for the determining of the multiple local complexity indicators and/or for the determining of the array data structure across multiple processing devices;

wherein the plurality of datasets define inference data and are obtained from an inference task provided by a machine-learning algorithm, and the method further comprises:
  accessing the array data structure to assess the inference data;
  controlling a technical system based on the inference task;
  aborting the inference task in response to detecting a wrong prediction based on an assessment of the array data structure; and
  when performing the aborting of the inference task, selectively transitioning the technical system to a safe state.

7. The computer-implemented method according to claim 6, wherein the multiple processing devices are part of a graphics processing unit.

8. A computer-implemented method of enabling an assessment of a plurality of datasets, each dataset of the plurality of datasets including a respective input datapoint in an input space and an associated output datapoint in an output space, the method comprising:
  for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood;
  for each dataset of the plurality of datasets: while executing calculations for the determining of the respective multiple local complexity indicators, selectively aborting at least a portion of the calculations prior to determining the respective multiple local complexity indicators for all of the multiple neighborhoods associated with the respective dataset; and
  determining an array data structure having at least a first array dimension and a second array dimension, the first array dimension resolving the multiple neighborhoods based on sizes thereof, the second array dimension resolving values of the local complexity indicators in a binned manner, wherein entries of the array data structure are indicative of a frequency of an occurrence of the values of the respective local complexity indicators at a respective size of the neighborhoods across all datasets of the plurality of datasets;
  wherein the plurality of datasets define inference data and are obtained from an inference task provided by a machine-learning algorithm, and the method further comprises:
    accessing the array data structure to assess the inference data;
    controlling a technical system based on the inference task;
    aborting the inference task in response to detecting a wrong prediction based on an assessment of the array data structure; and
    when performing the aborting of the inference task, selectively transitioning the technical system to a safe state.

9. The computer-implemented method according to claim 8, which comprises basing the selectively aborting on a probability that is progressively increased as the calculations progressively cover neighborhoods having larger sizes.

10. A computer-implemented method of enabling an assessment of a plurality of datasets, each dataset of the plurality of datasets including a respective input datapoint in an input space and an associated output datapoint in an output space, the method comprising:
  for each dataset of the plurality of datasets: determining multiple local complexity indicators for multiple neighborhoods of the input datapoint of the respective dataset in the input space, the multiple neighborhoods having different sizes, any given local complexity indicator being based on differences between input distances and output distances, the input distances being in the input space between the input datapoint of the respective dataset and the input datapoints of each of multiple further datasets in the respective neighborhood, the output distances being in the output space between the output datapoint of the respective dataset and the output datapoints of each of the multiple further datasets in the respective neighborhood;
  determining an array data structure including at least a first array dimension and a second array dimension, the first array dimension resolving the multiple neighborhoods based on their sizes, the second array dimension resolving values of the local complexity indicators in a binned manner, wherein entries of the array data structure are indicative of a frequency of an occurrence of the values of the respective local complexity indicators at a respective size of the neighborhoods across all datasets of the plurality of datasets;
  wherein each entry of the array data structure further includes an identification of the datasets that are associated with the frequency of the occurrence of the values of the respective local complexity indicators; and wherein the plurality of datasets define inference data and are obtained from an inference task provided by a machine-learning algorithm, and the method further comprises:

accessing the array data structure to assess the inference data;

controlling a technical system based on the inference task;

aborting the inference task in response to detecting a wrong prediction based on an assessment of the array data structure; and when performing the aborting of the inference task, selectively transitioning the technical system to a safe state.

11. The computer-implemented method according to claim 10, which comprises using the plurality of datasets as training data of a machine-learning algorithm.

12. The computer-implemented method according to claim 11, which comprises accessing the array data structure to assess the training data.

13. A computer-implemented method of supervising inference tasks provided by a machine-learning algorithm, the method comprising:

predicting, by the machine-learning algorithm, an inference output datapoint based on an inference input datapoint;

determining multiple local complexity indicators for multiple neighborhoods of the inference input datapoint in an input space, the multiple neighborhoods having different sizes, any given local complexity indicator being based on differences between input distances and output distances, the input distances being in the input space between the inference input datapoint and input datapoints of a plurality of datasets in the respective neighborhood, the output distances being in the output space between the inference output datapoint and the output datapoints of the plurality of datasets in the respective neighborhood, thereby obtaining a trace of local complexity indicators;

determining an array data structure including at least a first array dimension and a second array dimension, the first array dimension resolving the multiple neighborhoods based on their sizes, the second array dimension resolving values of the local complexity indicators in a binned manner, wherein entries of the array data structure are indicative of a frequency of an occurrence of the values of the respective local complexity indicators at a respective size of the neighborhoods across all datasets of the plurality of datasets;

performing a comparison between a trace of the local complexity indicators and the array data structure; and based on the comparison, selectively marking the inference output datapoint as reliable or unreliable;

wherein the plurality of datasets form training data upon which the machine-learning algorithm has been trained; and wherein the plurality of datasets define inference data and are obtained from an inference task provided by a machine-learning algorithm, and the method further comprises:

accessing the array data structure to assess the inference data;

controlling a technical system based on the inference task;

aborting the inference task in response to detecting a wrong prediction based on an assessment of the array data structure; and when performing the aborting of the inference task, selectively transitioning the technical system to a safe state.

\* \* \* \* \*